(12) United States Patent
Thomas et al.

(10) Patent No.: US 11,944,900 B2
(45) Date of Patent: *Apr. 2, 2024

(54) LIVE VIDEO GAME INTERVENTION

(71) Applicant: South Park Digital Studios LLC, New York, NY (US)

(72) Inventors: Jordan Thomas, New York, NY (US); Jeff Lake, New York, NY (US); Michael Kelly, New York, NY (US); Kain Shin, New York, NY (US); Stephen Alexander, New York, NY (US)

(73) Assignee: SOUTH PARK DIGITAL STUDIOS LLC, New York, NY (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/301,402

(22) Filed: Apr. 1, 2021

(65) Prior Publication Data

US 2021/0220732 A1 Jul. 22, 2021

Related U.S. Application Data

(63) Continuation of application No. 16/559,878, filed on Sep. 4, 2019, now Pat. No. 10,987,578.

(51) Int. Cl.
A63F 13/00 (2014.01)
A63F 13/34 (2014.01)
A63F 13/40 (2014.01)
A63F 13/55 (2014.01)
A63F 13/87 (2014.01)

(52) U.S. Cl.
CPC .............. *A63F 13/34* (2014.09); *A63F 13/40* (2014.09); *A63F 13/55* (2014.09); *A63F 13/87* (2014.09)

(58) Field of Classification Search
None
See application file for complete search history.

(56) References Cited

U.S. PATENT DOCUMENTS

| | | | | |
|---|---|---|---|---|
| 8,612,612 | B1* | 12/2013 | Dukes | H04L 67/141 709/203 |
| 9,802,125 | B1* | 10/2017 | Suskind | A63F 13/847 |
| 2006/0287045 | A1* | 12/2006 | Walker | G07F 17/32 463/16 |
| 2007/0078986 | A1* | 4/2007 | Ethier | H04L 69/24 709/227 |
| 2009/0041252 | A1* | 2/2009 | Hanna | H04L 63/12 380/278 |
| 2012/0190456 | A1* | 7/2012 | Rogers | A63F 13/60 463/42 |
| 2015/0375113 | A1* | 12/2015 | Justice | G06F 9/5027 463/42 |
| 2017/0078922 | A1* | 3/2017 | Raleigh | H04L 69/18 |
| 2017/0340256 | A1* | 11/2017 | Suskind | A63F 13/352 |

* cited by examiner

*Primary Examiner* — Paul A D'Agostino
(74) *Attorney, Agent, or Firm* — Fay Kaplun & Marcin, LLP

(57) ABSTRACT

A system and method for establishing a gaming session via cloud services with a first device, receiving information at the first device to establish a connection with a second device, and receiving at the first device instructions from the second device via the connection, wherein the instructions control an aspect of the gaming session.

20 Claims, 5 Drawing Sheets

LIVE VIDEO GAME INTERVENTION

PRIORITY DATA

The present application is a Continuation of U.S. patent application Ser. No. 16/559,878 filed on Sep. 4, 2019, now U.S. Pat. No. 10,987,578; the entire disclosure of the above application(s)/patent(s) is expressly incorporated herein by reference.

BACKGROUND

A video game may provide in-game quests or challenges to players. The challenges may require the use of in-game tools by the player's in-game character for the player to, e.g., complete the challenge or achieve an objective. The video game may provide a variety of items, e.g., weapons, tools, health recovery items, etc., that may make the challenges more or less difficult to accomplish. The character may also have variable attributes, e.g., speed, strength, health, etc., that are adjustable by acquiring the items or otherwise. In-game features, such as map layouts, non-player characters, etc. may make game objectives more or less difficult to accomplish. The player may acquire items/characteristics over the normal course of the gameplay (e.g., by discovering the items), may purchase items/characteristics with in-game money (e.g., earned for various reasons during game play) or real-world money (e.g., through microtransactions), or may unlock items/characteristics (e.g., by defeating a boss character). In multiplayer games, items/characteristics may be tradable amongst characters, winnable from other characters, etc.

The gameplay experience for a player may be dependent on the aforementioned features. A player may wish for a gameplay experience that is more or less challenging or variable than current gameplay rules allow. Gameplay mechanisms exist where a character may find items/characteristics or be granted items/characteristics as, e.g., a reward for accomplishing objectives. However, these mechanisms are typically built into the standard gameplay of the game and are executed based on predefined rules of the gameplay.

SUMMARY

The present disclosure is directed to a method comprising, at a first device, establishing a gaming session via cloud services, receiving information to establish a connection with a second device, and receiving instructions from the second device via the connection, wherein the instructions control an aspect of the gaming session.

The present disclosure is further directed to a method comprising, at a first device, receiving, via cloud services, an indication that a second device currently has a gaming session established with the cloud services; establishing a connection with the second device; and sending instructions to the second device, wherein the instructions control an aspect of the gaming session.

The present disclosure is further directed to a system comprising cloud services hosting a gaming session and a first device receiving from the cloud services an indication that a second device has established a gaming session and submitted a message to the cloud services, the first device further selecting the message and sending instructions to either one of the cloud services or the second device, wherein the instructions alter an aspect of the gaming session.

DETAILED DESCRIPTION

Figure 1:
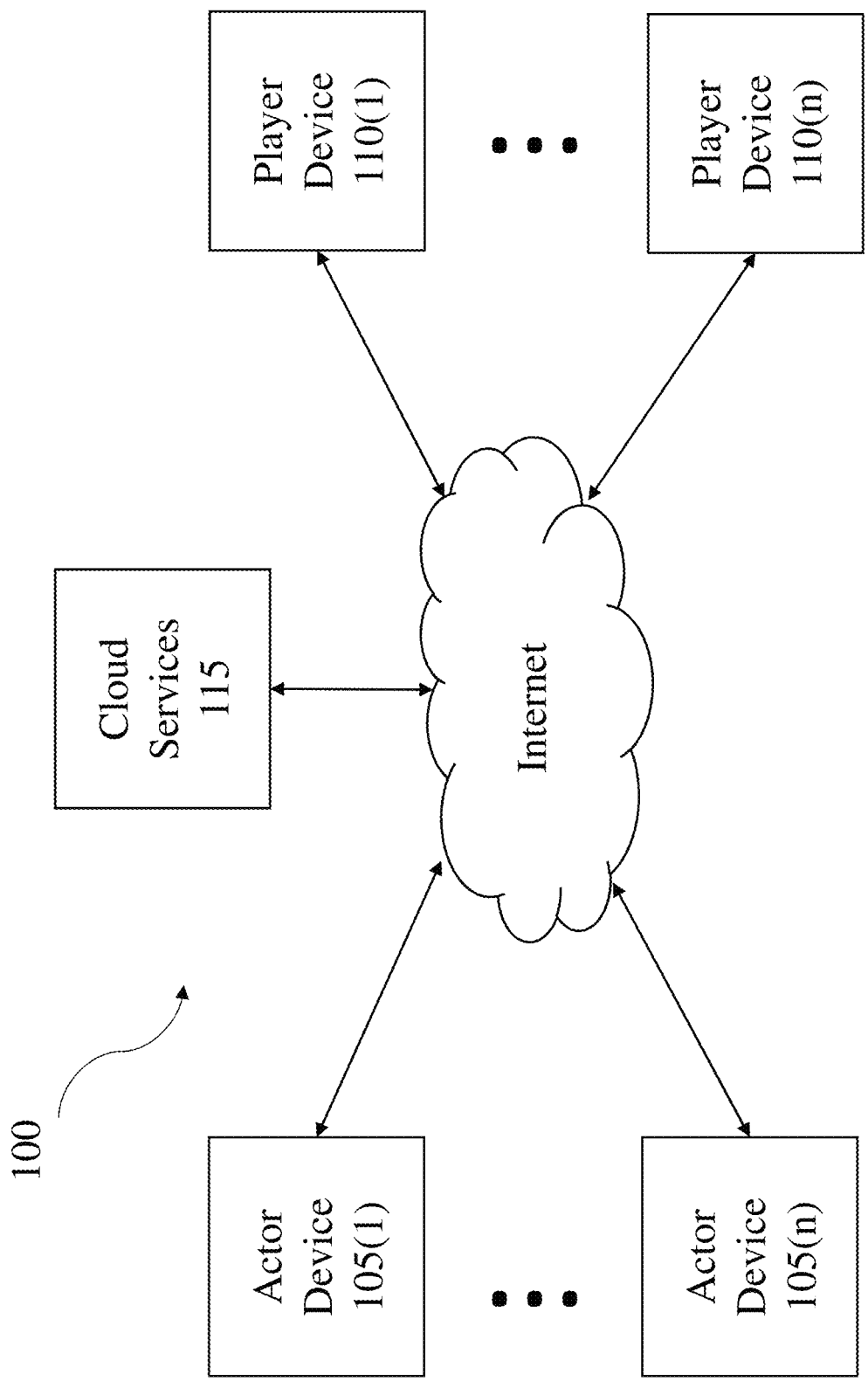
FIG. 1 shows a system for gameplay intervention according to various exemplary embodiments of the present disclosure.

The exemplary embodiments may be further understood with reference to the following description and the related appended drawings, wherein like elements are provided with the same reference numerals. The exemplary embodiments are related to a device, system, and method for generating an online gaming session in which a live actor may interact with a player and intervene in the gaming session. The actor/player interaction may be initiated by the player, through an in-game request, or by the actor, via secret handshaking between the actor device and the player device. The types of interventions available to the actor may be dependent on the nature of the game and may include, for example, manipulating a player's character or characteristics of the character directly, manipulating a gaming environment, spawning a non-player character (NPC) for the actor to control, etc. The exemplary embodiments may be implemented in single-player games or multi-player games.

The exemplary embodiments may apply to any type of online cloud-based game but are particularly applicable to games where a player assumes the role of a character, or avatar. For example, the game may be a first-person shooting game, a role-playing game (RPG), etc. The character may be defined in different ways. For example, the character may possess attributes, such as health or strength. The character may possess abilities, such as a capacity to heal or teleport. The character may possess items, such as weapons, keys or healing items. Reference may be made throughout the description to these character-defining traits and/or items as examples only and the exemplary embodiments are not limited thereto.

A "player" refers to a person playing an online video game hosted at a game server via software executed on a player device. The player(s) may be in any location with network access. The term "character" refers to the in-game avatar controlled by the player. At various points in the present disclosure the terms "player," "user," "character," and "avatar" may be used interchangeably. An "actor" refers to a person who may also "play" the online video game via a user interface executed on an actor device. However, the "actor" has a special user interface for implementing exclusive features for intervening in the video game. The "player device" and the "actor device" may be any computer hardware devices having network access and features for executing the online video game, such as a desktop computer, laptop computer, smartphone, gaming console, etc. The various servers described herein may be any combination of hardware and software providing services to the devices.

The server(s) may be a hosted remotely by a cloud computing or cloud gaming provider or may not be specific to gaming. Various features described herein may be hosted on different servers provided by different entities or may be combined and implemented at a server space provided by the game developer.

FIG. 1 shows a system 100 for live gameplay intervention according to various exemplary embodiments of the present disclosure. The system 100 is configured for one or more actors, via actor device(s) 105, and one or more players, via player device(s) 110, to interact and/or participate in an online video game environment. The system 100 includes cloud services 115 comprising one or more servers configured to host the video game and perform other functions, including, e.g., matchmaking, as well as various databases, web services, API gateways, microservices, etc., to be explained in further detail below. The devices 105, 110 may be any type of computer hardware device, such as a desktop computer, laptop computer, tablet computer, smartphone, gaming console, etc., having a connection to the Internet. The connection to the Internet may be via any suitable communications network and may be wired or wireless. The connection to the Internet allows the devices 105, 110 to access services made available by the server(s) 115. The devices 105, 110 each have software stored on a memory and a processor to execute local game software on the device 105, 110.

The devices 105, 110 each have one or more inputs that may include a joystick, a mouse, a keyboard, a touchpad, a microphone, or any other hardware compatible with the devices 105, 110. The inputs may be integral parts of the devices 105, 110 or may be coupled to the devices 105, 110 via suitable connections. Such connections may include a wired connection or a wireless connection, such as Bluetooth.

The player device(s) 105 has local game software stored thereon to execute an instance of the game hosted at the server 115. The actor device(s) 110 also has local game software stored thereon to execute an instance of the game. In addition, the actor device(s) 110 has access to an intervention tool that provides exclusive functionality to intervene in a game session. The game features will be described herein with respect to a four-player cooperative game, where the players control avatars to cooperatively complete a mission while battling against non-player characters (NPCs) trying to hinder the mission. However, the principles described herein are applicable to any type of game with any number of players acting cooperatively or competitively.

Figure 2:
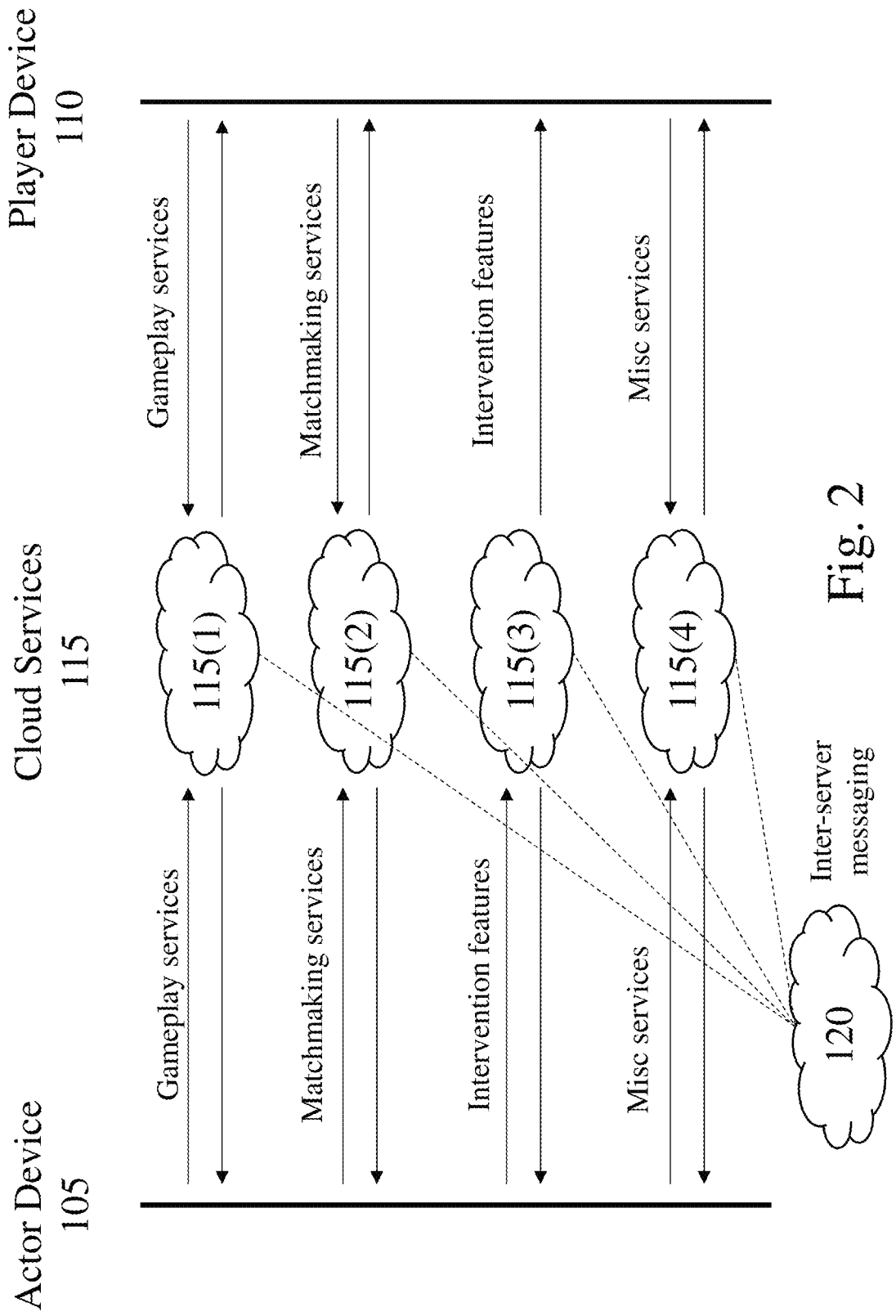
FIG. 2 shows an exemplary server arrangement for gameplay intervention according to various exemplary embodiments of the present disclosure.

The game execution and intervention may be described with respect to a plurality of cloud servers 115 supporting various aspects of the system. It will be understood by those skilled in the art that the cloud servers 115 may be elements of a cloud services suite, as discussed above. FIG. 2 shows an exemplary cloud services arrangement 115 comprising servers 115(1)-115(4) in communication with an exemplary actor device 105 and player device 110. A game server 115(1) hosts the game into which the actor intervenes. The game server 115(1) runs each of the gaming sessions, transmits data to devices participating in the gaming sessions that allows the devices to render a local version of the game on a display and processes user input from connected devices. The game server 115(1) may be a single server or a collection of servers. The game server 115(1) may provide only game-related hosting features or may not be specific to games. The game server 115(1) may simultaneously host a plurality of individual gaming sessions.

A matchmaking server 115(2) provides matchmaking services for connecting players for participation in a game session. The matchmaking server 115(2) may be provided by a platform, e.g., Steam, Xbox Live, Playstation Network, etc., may be provided by middleware, or may be provided by a game developer. Player devices 110 and actor devices 105 may connect through handshaking to establish a communication session, which allows for direct peer-to-peer messaging. The matchmaking server 115(2) in this embodiment is a separate server from the game server 115(1), however, in other embodiments, matchmaking capabilities may be implemented directly in the game and provided by the game server 115(1).

An intervention server 115(3) facilitates the intervention functionality provided to the actors. The intervention tools may be accessed via an Intervention Application that may be a web-based application. The web-based application may have a secret URL known to the actors and/or require actor log-in credentials. An actor device 105 and a user device 110 may connect in the same manner as two player devices 110 would connect, i.e., via the matchmaking techniques provided by the matchmaking server 115(2). However, execution of the Intervention Application at the actor device 105 (while the game is running) provides a suite of features to the actor that are not available to the players, to be described in detail below. The Intervention Application may provide a feature to implement secret handshaking between the actor device 105 and the player device 110 so that, unbeknownst to the player, the actor device 105 may connect to the player device 110 via a back door secretly left open on the online session of the player device 110. It is noted that the open back door is not a flaw of the system as when referred to in a hacking situation. Rather, the player, when consenting to playing the game or to the intervention feature, may be made aware that the actor may intervene in the game. The player, however, may be unaware when and if the intervention will occur. In one exemplary embodiment, the intervention functionality is hosted separately from the game for security purposes. However, if the intervention functionality were to be provided directly to players, instead of to separate actors, the intervention functionality may be provided at the game server 115(1) and implemented directly in the game via an in-game interface.

Miscellaneous server(s) 115(4) provide secondary services for implementing an intervention by the actor. For example, the miscellaneous server(s) 115(4) may include a database tracking which players are online and available for intervention, a database to update properties used by actors for intervention, middleware for maintaining user profile data/inventory, etc. An inter-server messaging service 120 may allow messages to pass securely between the various servers 115 involved in the gaming intervention. However, if the aforementioned features were provided in-game, the messaging service 120 may be not be used.

The Intervention Application provides an intervention user interface to the actor for intervening in the game that is not available to normal players. The intervention user interface provides exclusive game features tailored to the game. The features may be developed on a game-by-game basis using the same development tools for developing the game itself.

In a first embodiment, the Intervention Application executed on the actor device 105 allows the actor to intervene in one or more aspects of the gameplay in a "live" manner. For example, the actor may temporarily control a player's avatar. The player may be locked out of control of the avatar, and also locked out of communicating with other players, such that the other players are unaware that anything out of the ordinary has occurred. The actor may also assume control of the communication capabilities and pose as the player, announce that the player has been overtaken, or communicate with the remaining players in any other way. The "invaded" avatar may have abilities/attributes unavailable to the avatar when the player is in control. In another example, the actor may temporarily control non-player characters (NPCs). The NPC may have different or enhanced abilities when it is under actor control. The actor may also speak through the NPC. Alternately, an NPC may be spawned specifically for actor takeover. In still another example, the actor may assume control of objects in the game session, providing a "haunted house" type interaction with the avatars by causing objects to float, flickering lights, etc. Aspects of the player's display may be modified such that the player sees other avatars as monsters or vice versa. The actor may also transport the avatar to a different portion of the game map. The actor may also transport the avatar to a different portion of the game map.

The actor may have a viewpoint remote from that of any of the players. For example, the actor may be considered a separate being in the world of the gameplay having a personal camera and control system in service to the actor's purposes. In one embodiment, the actor has a camera focused on a specific player and may cycle between players. In another embodiment, the actor's separate being may e.g. fly through the air of the world of the gameplay. In still another embodiment, the actor may have a viewpoint from a controlled player's avatar when the actor is controlling the avatar.

During the "live" intervention the actor and the player may communicate via one or more user inputs. In one embodiment, both the actor device 105 and the player device 110 have microphones for receiving audio input. If a microphone is unavailable, the actor and player may interact via text input. Messaging may be peer to peer, such that the text and audio are sent directly to/from the game applications executed on the respective devices. The actor may have full discretion over how to respond to player messages. For example, the actor may ignore the player. The actor may consider player requests for particular interventions by the actor. The actor may also direct the player to perform a task and temporarily relinquish control of the avatar to allow the player to attempt to complete the task, while retaining a connection to the player device 110 such that the actor may intervene again in a manner dependent on the player's performance of the task. The "live" intervention is based on the Intervention Application and the game running in the same game executable simultaneously, as distinguished from a non-engaging prayer response, to be discussed further below.

Figure 3:
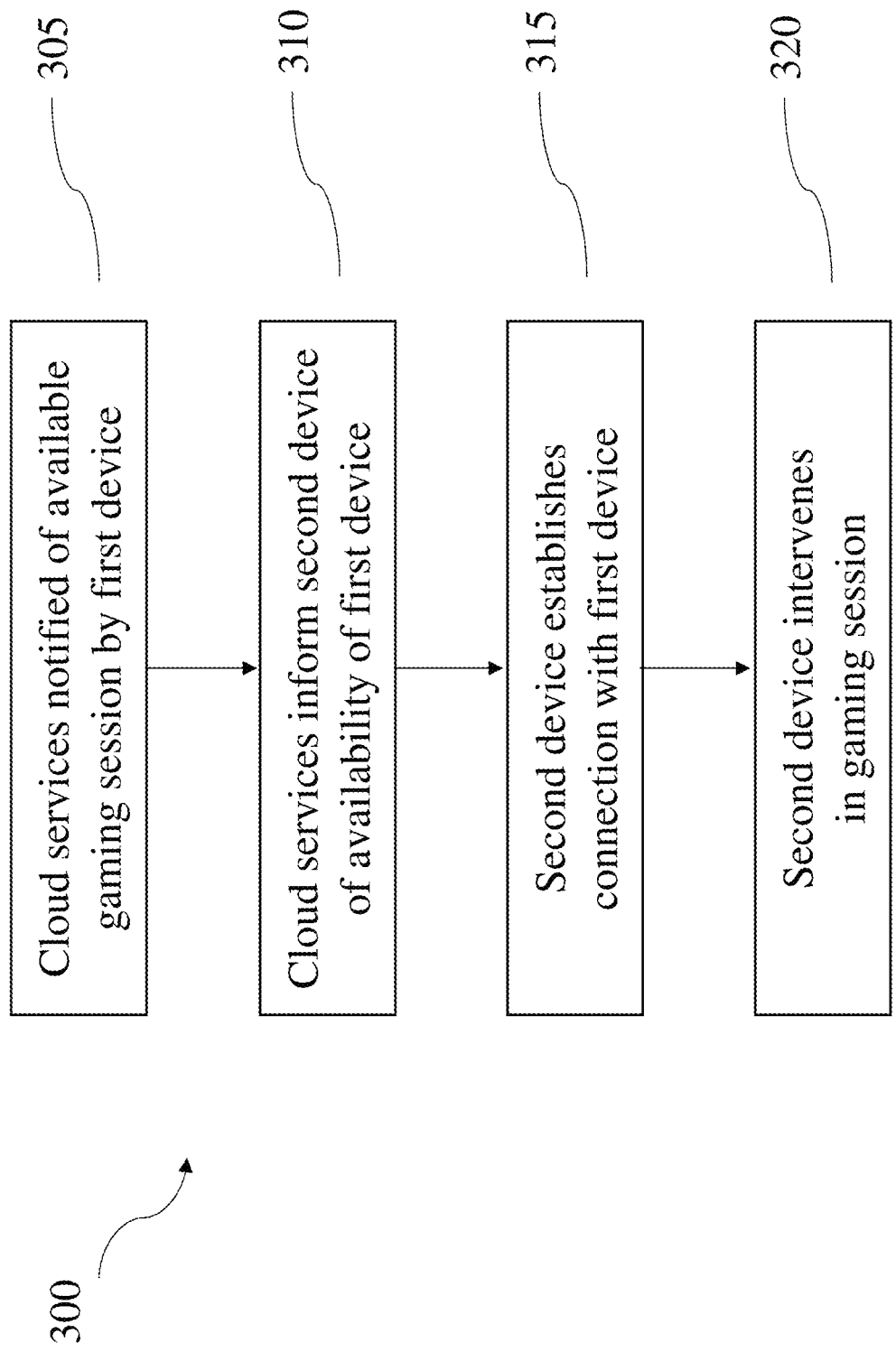
FIG. 3 shows a method for live gameplay intervention according to various exemplary embodiments of the present disclosure.

FIG. 3 shows an exemplary method 300 for a "live" intervention according to various exemplary embodiments of the present disclosure. In 305, a first device, e.g., the player device 110 initiates or connects to a gaming session and the cloud services 115 are notified of the available gaming session. The gaming session may be an instance of a single-player game or a multi-player game. The game may involve controllable avatars or some other controllable entity. The gaming session may encompass any time that the player has control over the controllable entity. In other words, an active "mission" need not be initiated before performing the exemplary method; the avatar may be in, e.g., a virtual lobby.

In 310, the cloud services 115 inform a second device, e.g., the actor device 105, of the first device being available for intervention. For example, the actor device 105 may have access to a database tracking which players are connected to an active gaming session.

In 315, the second device establishes a connection with the first device. The connection may be established via a back door secretly left open on the online session of the first device. The first device may not display a notification or inform the player of the connection being established. The connection may be established when the actor decides to intervene in game play. After the intervention is over, the connection may be released or maintained for further interventions.

In 320, the second device intervenes in the gaming session. Instructions received at the second device via the intervention user interface of the Intervention Application may then be transmitted to the first device to allow the actor to intervene in game play. For example, the instructions may control the controllable entity originally controlled by the first device. Other examples of interventions were provided above. When the first and second devices are in communication, the devices may send messages between each other via the peer-to-peer connection.

Figure 4:
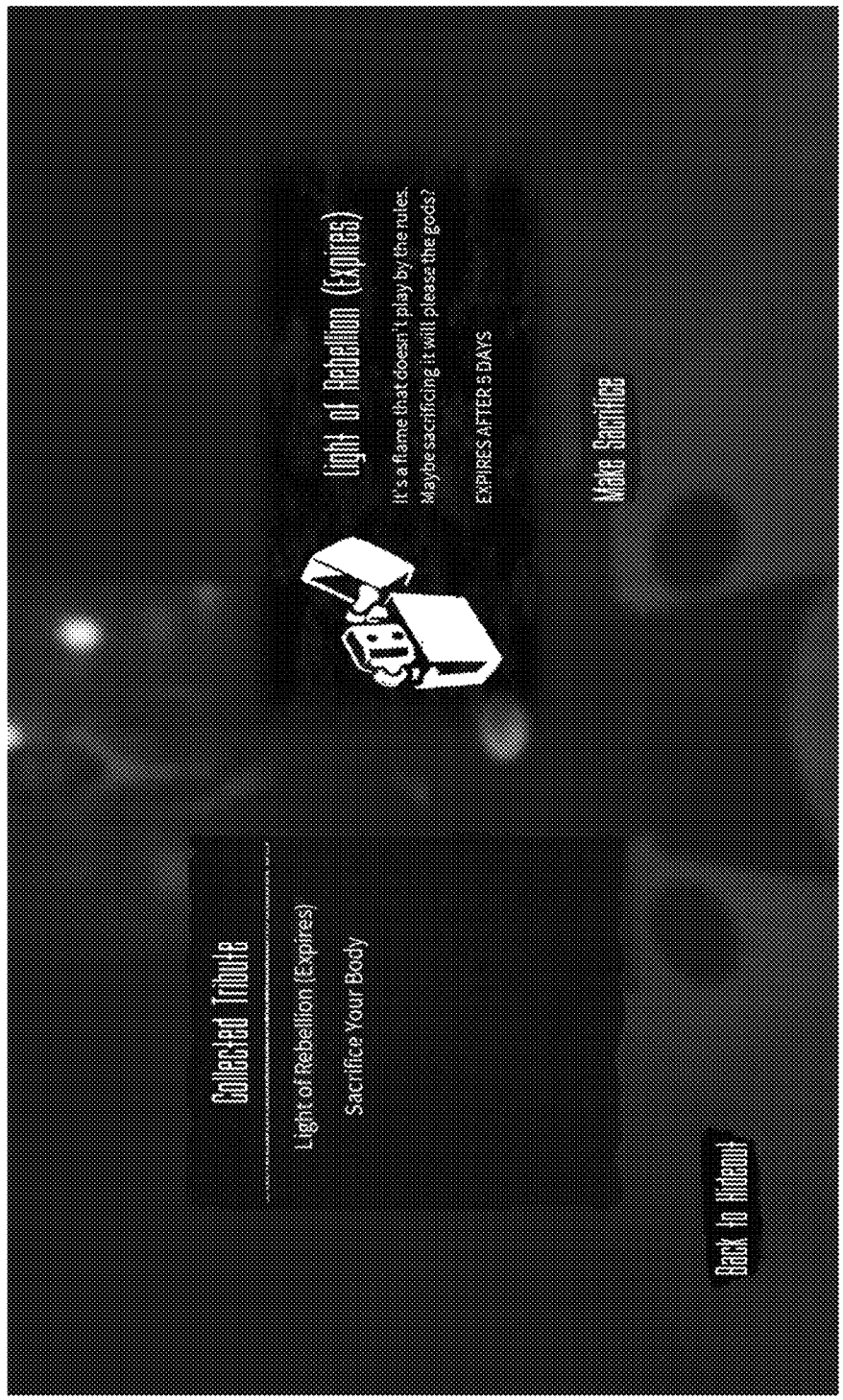
FIG. 4 shows a request screen for gameplay intervention according to various exemplary embodiments of the present disclosure.

In another embodiment, the Intervention Application may provide an interface for receiving requests from players. This embodiment may be considered an in-game "prayer" tool, whereby the player submits the "prayer" to a "god" for, e.g., in-game benefits such as items or enhanced avatar characteristics. The "prayer" may be for anything related to the gameplay. For example, in a first-person shooter-type game, the player may request a more powerful weapon. FIG. 4 shows an exemplary request screen for submitting a prayer request. For example, FIG. 4 shows an interface where the player may make a "sacrifice" to the "god" and record a text or voice "prayer." The player may make the request via the inputs to the player device 110. For example, the player may type a request via a keyboard, select a predefined request via a mouse click, or verbally recite a request via a microphone. The request does not need to be in a specific form or made with specific syntax. Indeed, the player may choose to input whatever the player chooses into the prayer tool. Once the request is typed, clicked, spoken, or otherwise created, it is recorded by the player device 110 and transmitted via the Internet to the game server 115(1). From the game server 115(1) the request is forwarded to the intervention server 115(3) and processed by the Intervention Application.

The Intervention Application may process prayer requests from multiple distinct game sessions. For example, the game server 115(1) may have sufficient computing power to execute multiple instances of gaming sessions simultaneously. In another example, the game may be a massive multiplayer online role-playing game (MMORPG) where only one individual gaming session is executed with a near limitless number of individual characters taking part. Regardless of the nature of the game, there may be a large number of player prayers being received at the game server 115(1) at a rapid pace. Thus, the Intervention Application may include a prayer log that the prayers are added to at the time they are received. For example, a first player may make a first prayer request at a first time and a second player may make a second prayer request at a second time later than the first time. The second prayer may be added to the prayer log after the first prayer. The first player and the second player may be taking part in the same gaming session or may be in different gaming sessions.

When multiple players are transmitting prayers in rapid succession, responding to the large number of prayers in the prayer log may be unduly burdensome for a single actor.

Thus, there may be multiple live actors processing the prayer requests. From the prayer log, prayers may be assigned to a prayer queue of an individual actor. The prayer queue may appear on the actor device 105 and be tailored to the actor in control. Once in the prayer queue, an actor may process the prayer in various ways.

In one example, the actor may respond to a prayer by initiating a "live intervention," similar to the embodiment described above. For example, the actor device 105 may connect to the player device 110 via secret handshaking and the actor may implement any of the intervention features discussed above, e.g., controlling the avatar, controlling an NPC, etc. The god may transport the player to another area of the gameplay map, lead the player, via audio or text, to perform tasks with the player's character, or provide another disruption to the player's objectives. In essence, when the player chooses to send a "prayer" to the "god," the player accedes to any actions that the "god" chooses to inflict upon the character, whether beneficial or detrimental to the player's gameplay goals.

Alternately, the actor may respond in a non-engaging manner. "Non-engaging," in the present context, refers to a direct response to the prayer that completes the interaction between the player and the actor. The actor may provide the direct response in different ways. For example, the actor may grant the prayer and provide the benefit to the player. As previously discussed, the benefit may be an item provided to the character or may be an increase in beneficial qualities for the player. Alternately, the benefit may be inserted into the gameplay of the gaming session close to the character, such that the character may acquire the item through in-game interaction with the item, such as by picking it up. The actor may also deny the player's request. The actor may provide nothing, may provide a lesser item, or may reduce beneficial qualities of the player's avatar, such as health or stamina.

In addition to the features discussed above, the actor may also transport the player's character to a different location in the gameplay. For example, the actor may remove the character from danger, may advance the character past an obstacle, etc. The actor may also transport the player's character to a random part of the gameplay map. All of these features are implementable through the intervention user interface provided to the actor by the Intervention Application.

In addition to gameplay changes, the actor may respond to the prayer with a voice recording or message. The actor has discretion in formulating the response. For example, the actor may modulate his or her voice to attempt to evoke an emotional response from the player. This mode of response may be turn-based, i.e., non-interactive. The response may be recorded by the actor via the Intervention Application and forwarded to the game server 115(1) for receipt by the player. The player may no longer be online when the request is answered by the actor. Thus, the player may be notified the next time the player is online that a prayer response is available for download.

Figure 5:
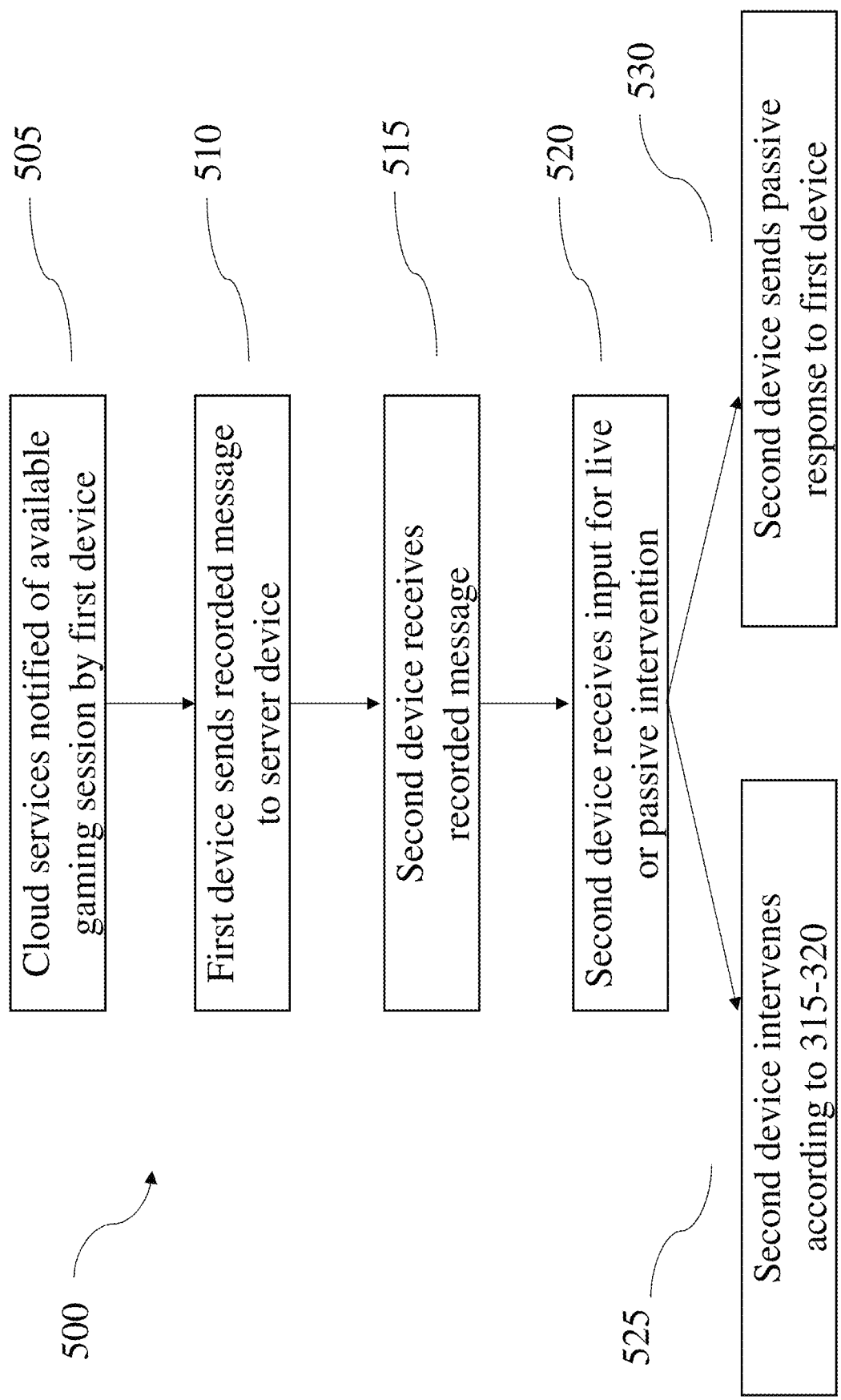
FIG. 5 shows a method for passive gameplay intervention according to various exemplary embodiments of the present disclosure.

FIG. 5 shows an exemplary method 500 for a prayer response intervention according to various exemplary embodiments of the present disclosure. In 505, a first device, e.g., the player device 110 initiates or connects to a gaming session and the cloud services 115 are notified of the available gaming session, similar to step 305 discussed above.

In 510, the first device sends a recorded message to the cloud services 115. The message may be recorded verbally (via a microphone), textually (via a keyboard), or otherwise. The content of the message may be anything, including, e.g., a request for in-game upgrades. The cloud services 115 may store the request locally in a prayer log or forward the message to a repository hosted on another server.

In 515, a second device, e.g., the actor device 105, receives the recorded message from the cloud services 115, or from any intermediate repositories the cloud services 115 forwarded the message to previously. The second device may be associated with a message queue for a live actor, and the recorded message may be accessible therefrom.

In 520, the second device receives an input selecting either one of a live intervention or a passive intervention. If the live intervention is selected, the method proceeds to 525 and the second device establishes a connection with the first device and intervenes in the gaming session according to 315-320. If the passive intervention is selected, the method proceeds to 530.

In 530, information relating to a passive game intervention and/or a recorded message are sent to the first device from the second device via the cloud services. In other words, the in-game character controlled by the first device in the gaming session may be granted in-game benefits/detriments and/or receive a message in response to the initially recorded message, thus completing the interaction between the devices.

Multiple examples have been provided in the foregoing with respect to the types of interventions available to the actor. However, the exemplary embodiments are not limited to the examples provided. The available interventions may be dependent on the nature of the game and may be related to any controllable aspect of the gameplay. The controllable aspect may be appearance-based, physics-based, gameplay-based, attribute-based, in-game menu-based or based on any other aspect of the gaming experience conceivable by a person skilled in the art.

It will be apparent to those skilled in the art that various modifications may be made to the present disclosure, without departing from the spirit or the scope of the exemplary embodiments. Thus, it is intended that the present disclosure cover modifications and variations of the exemplary embodiments provided they come within the scope of the appended claims and their equivalent.

The invention claimed is:

1. A method, comprising:
at a cloud services suite comprising one or more cloud servers:
hosting a gaming session;
establishing a connection to a first device and a second device, the gaming session including a player controlled by the first device; and
implementing a back door handshaking, initiated by the second device, between the first and second devices to connect the first and second devices without notifying a user of the first device, wherein, when connected, the second device is configured to intervene in the gaming session by performing actions that are unavailable to the player controlled by the first device.

2. The method of claim 1, further comprising:
establishing a direct peer-to-peer messaging capability between the first and second devices.

3. The method of claim 1, further comprising:
providing an intervention user interface to the second device for performing the actions in the gaming session that are unavailable to the player controlled by the first device.

4. The method of claim 3, wherein the intervention user interface allows the second device to assume control of the player in the gaining session.

5. The method of claim 3, wherein the intervention user interface allows the second device to modify capabilities of the player in the gaming session.

6. The method of claim 1, further comprising:
receiving a request from the first device for an alteration to capabilities of the player in the gaming session or a feature of the gaming session; and
transmitting the request to the second device.

7. The method of claim 6, further comprising:
storing the request in a request log, wherein the request log is viewable by the second device and the request is selected by the second device prior to intervening in the gaming session.

8. A cloud services suite, comprising:
one or more servers configured to perform operations comprising: hosting a gaming session;
establishing a connection to a first device and a second device, the gaming session including a player controlled by the first device; and
implementing a back door handshaking, initiated by the second device, between the first and second devices to connect the first and second devices without notifying a user of the first device, wherein, when connected, the second device is configured to intervene in the gaming session by performing actions that are unavailable to the player controlled by the first device.

9. The cloud services suite of claim 8, wherein the operations further comprise:
establishing a direct peer-to-peer messaging capability between the first and second devices.

10. The cloud services suite of claim 8, wherein the operations further comprise:
providing an intervention user interface to the second device for performing the actions in the gaming session that are unavailable to the player controlled by the first device.

11. The cloud services suite of claim 10, wherein the intervention user interface allows the second device to assume control of the player in the gaming session.

12. The cloud services suite of claim 10, wherein the intervention user interface allows the second device to modify capabilities of the player in the gaming session.

13. The cloud services suite of claim 8, wherein the operations further comprise:
receiving a request from the first device for an alteration to a feature of the gaming session; and
transmitting the request to the second device.

14. The cloud services suite of claim 13, wherein the operations further comprise:
storing the request in a request log, wherein the request log is viewable by the second device and the request is selected by the second device prior to intervening in the gaming session.

15. The cloud services suite of claim 8, wherein the one or more servers comprise a gaming server for hosting the gaming session, a matchmaking server for connecting the first and second devices, and an intervention server for providing to the second device a capability to intervene in the gaming session.

16. A method, comprising:
at a cloud services suite comprising one or more cloud servers: hosting a gaming session;
receiving, from a first device, a request for an alteration to a feature of the gaming session;
storing the request in a request log viewable by a second device; and
when the request is selected from the request log by the second device, allowing the second device to initiate a hack door handshaking with the first device to intervene in the gaming session by performing actions that are unavailable to a player controlled by the first device without notifying a user of the first device.

17. The method of claim 16, further comprising:
establishing a direct peer-to-peer messaging capability between the first and second devices.

18. The method of claim 16, further comprising:
providing an intervention user interface to the second device for performing the actions in the gaming session that are unavailable to the player controlled by the first device.

19. The method of claim 18, wherein the intervention user interface allows the second device to assume control of the player in the gaming session.

20. The method of claim 18, wherein the intervention user interface allows the second device to modify capabilities of the player in the gaming session.

* * * * *

UNITED STATES PATENT AND TRADEMARK OFFICE
CERTIFICATE OF CORRECTION

| | |
|---|---|
| PATENT NO. | : 11,944,900 B2 |
| APPLICATION NO. | : 17/301402 |
| DATED | : April 2, 2024 |
| INVENTOR(S) | : Thomas et al. |

It is certified that error appears in the above-identified patent and that said Letters Patent is hereby corrected as shown below:

In the Claims

Claim 4, Column 8, Line 67:
"player in the gaining session" should read "player in the gaming session".

Claim 16, Column 10, Line 26:
"hack door handshaking with the first device to inter-" should read "back door handshaking with the first device to inter-".

Signed and Sealed this
Eighteenth Day of June, 2024

*Katherine Kelly Vidal*

Katherine Kelly Vidal
*Director of the United States Patent and Trademark Office*